(12) United States Patent
Deb et al.

(10) Patent No.: US 6,354,628 B1
(45) Date of Patent: Mar. 12, 2002

(54) SEAT BELT ANCHOR ASSEMBLY

(75) Inventors: Anindya Deb, Dearborn; Nripen Kumar Saha, Ann Arbor; Stephen Matthew Calso, West Bloomfield, all of MI (US)

(73) Assignee: Ford-Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/482,221

(22) Filed: Jan. 13, 2000

(51) Int. Cl.⁷ .............................................. B60R 22/00
(52) U.S. Cl. ...................................... 280/805; 297/470
(58) Field of Search ............................. 280/801.1, 805, 280/804, 808; 297/468, 470, 483, 486

(56) References Cited

U.S. PATENT DOCUMENTS

| | | | |
|---|---|---|---|
| 5,529,344 A | 6/1996 | Yasui et al. | |
| 5,685,566 A | 11/1997 | Hirase et al. | |
| 5,692,780 A | * 12/1997 | Yasui ...................... | 280/801.2 |
| 5,779,270 A | 7/1998 | Tanaka | |
| 5,826,907 A | 10/1998 | Saito et al. | |
| 5,863,069 A | 1/1999 | Wickenheiser et al. | |
| 5,863,071 A | 1/1999 | Li-Calso | |
| 6,032,982 A | * 3/2000 | Pakulsky et al. ........... | 280/805 |
| 6,106,012 A | * 8/2000 | Boegge et al. ............ | 280/801.1 |

* cited by examiner

Primary Examiner—Paul N. Dickson
Assistant Examiner—Faye M. Fleming
(74) Attorney, Agent, or Firm—David B. Kelley

(57) ABSTRACT

A seat belt anchor assembly is provided for use in an automotive vehicle wherein the vehicle includes an occupant compartment having a side pillar forming a structural part of a vehicle body. The seat belt anchor assembly includes an anchor bolt fixedly secured to the side pillar and having a shank portion defining a bolt axis and a head portion including an outer cylindrical surface extending axially from the shank portion to an annular face facing toward an interior of the occupant compartment. The seat belt anchor assembly further includes a seat belt sling member supported by the shank portion for receiving a seat belt webbing forming an anchor point along the side pillar. The seat belt anchor assembly also includes a trim panel adapted to be secured to the side pillar for covering the anchor bolt and having an energy absorbing member extending axially between the trim panel and the head portion of the anchor bolt. The energy absorbing member includes a tubular member supported between the support ribs and spaced axially from the trim panel for encapsulating the head portion of the anchor bolt and a planar shelf closing an end of the tubular member adjacent the trim panel for contacting the annular face of the head portion to dissipate energy through the energy absorbing member in response to impact forces acting upon the trim panel through the interior of the occupant compartment.

11 Claims, 3 Drawing Sheets

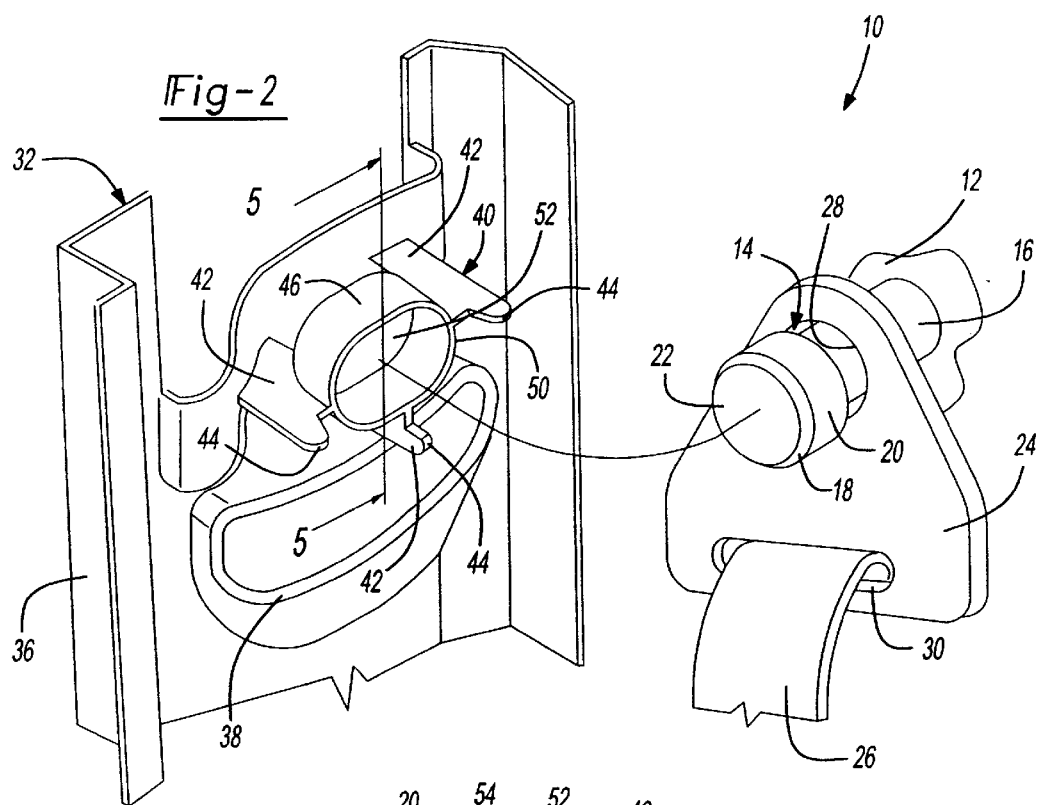
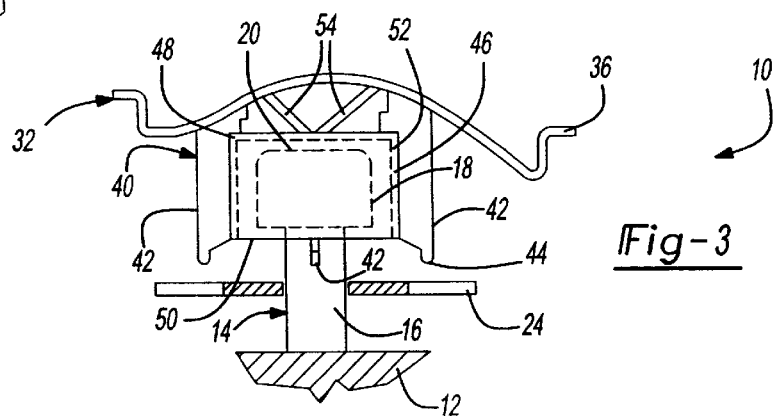
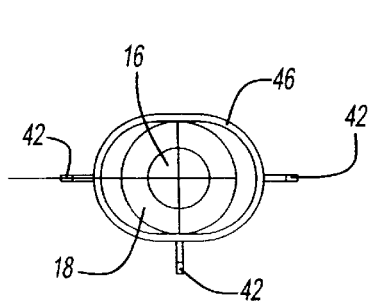
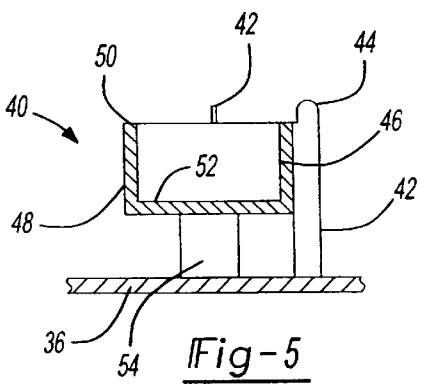

SEAT BELT ANCHOR ASSEMBLY

BACKGROUND OF THE INVENTION

1. Field of the Invention

The present invention relates generally to a seat belt anchor assembly and, more particularly, to a seat belt anchor assembly having an energy absorbing member for absorbing impact forces on the seat belt anchor assembly.

2. Description of the Related Art

Seat belt components for automotive vehicles commonly include a three-point type seat belt assembly having a seat belt webbing with a first end attached to a seat belt retractor and a second end attached to a permanent side anchor bolt. An intermediate portion of the seat belt webbing between the first end and the second end is typically trained through a seat belt sling member, commonly referred to as a D-ring, which is secured by an anchor bolt to an upper portion of a structural side B-pillar of the automotive vehicle. The D-ring positions the seat belt webbing adjacent to an upper torso of a belted occupant for securing the occupant to a vehicle seat. However, the D-ring and anchor bolt are also located in relatively close proximity to the belted occupant. Therefore, it is desirable to provide a seat belt anchor assembly having an energy absorbing member for absorbing energy if impacted from an impact with the D-ring and anchor bolt. Energy absorbing members for seat belt anchor assemblies are commonly known in the art as exemplified in U.S. Pat. Nos. 5,863,069 and 5,863,071.

It remains desirable to provide an improved seat belt anchor assembly having an energy absorbing member which absorbs energy from impact forces with the seat belt anchor bolt and which may be integrally molded with a trim panel for covering the anchor bolt and D-ring within the interior of the vehicle.

SUMMARY OF THE INVENTION

Accordingly, the present invention is a seat belt anchor assembly for use in an automotive vehicle wherein the vehicle includes an occupant compartment having a side pillar forming a structural part of a vehicle body. The seat belt anchor assembly includes an anchor bolt fixedly secured to the side pillar and having a shank portion defining a bolt axis and a head portion including an outer cylindrical surface extending axially from the shank portion to an annular face facing toward the interior of the passenger compartment. The seat belt anchor assembly also includes a seat belt sling member supported by the shank portion for receiving a seat belt webbing forming an anchor point along the side pillar. The seat belt anchor assembly further includes a trim panel adapted to be secured to the side pillar for covering at least the anchor bolt wherein the trim panel has an energy absorbing member extending axially between the trim panel and the head portion of the anchor bolt. The seat belt anchor assembly additionally includes a tubular member supported between the support ribs and axially spaced from the trim panel for encapsulating the head portion of the anchor bolt and a planar shelf closing an end of the tubular member adjacent the trim panel for contacting the annular face of the head portion to dissipate energy through the energy absorbing member in response to impact forces acting upon the trim panel through the interior of the occupant compartment.

One advantage of the present invention is that a new seat belt anchor assembly is provided for an automotive vehicle. Another advantage of the present invention is that the seat belt anchor assembly includes an energy absorbing member which absorbs energy from impact forces with the seat belt anchor bolt.

Other features and advantages of the present invention will be readily appreciated as the same becomes better understood after reading the subsequent description when considered in connection with the accompanying drawings.

BRIEF DESCRIPTION OF THE DRAWINGS

FIG. 2 is a perspective view of the seat belt anchor assembly of FIG. 1.

FIG. 3 is a fragmentary side view of the seat belt anchor assembly of FIGS. 1 and 2.

FIG. 4 is a top view of an energy absorbing member and anchor bolt of the seat belt anchor assembly of FIGS. 1 and 2.

FIG. 5 is a sectional view taken along line 5—5 of FIG. 2.

DESCRIPTION OF THE PREFERRED EMBODIMENT(S)

Figure 1:
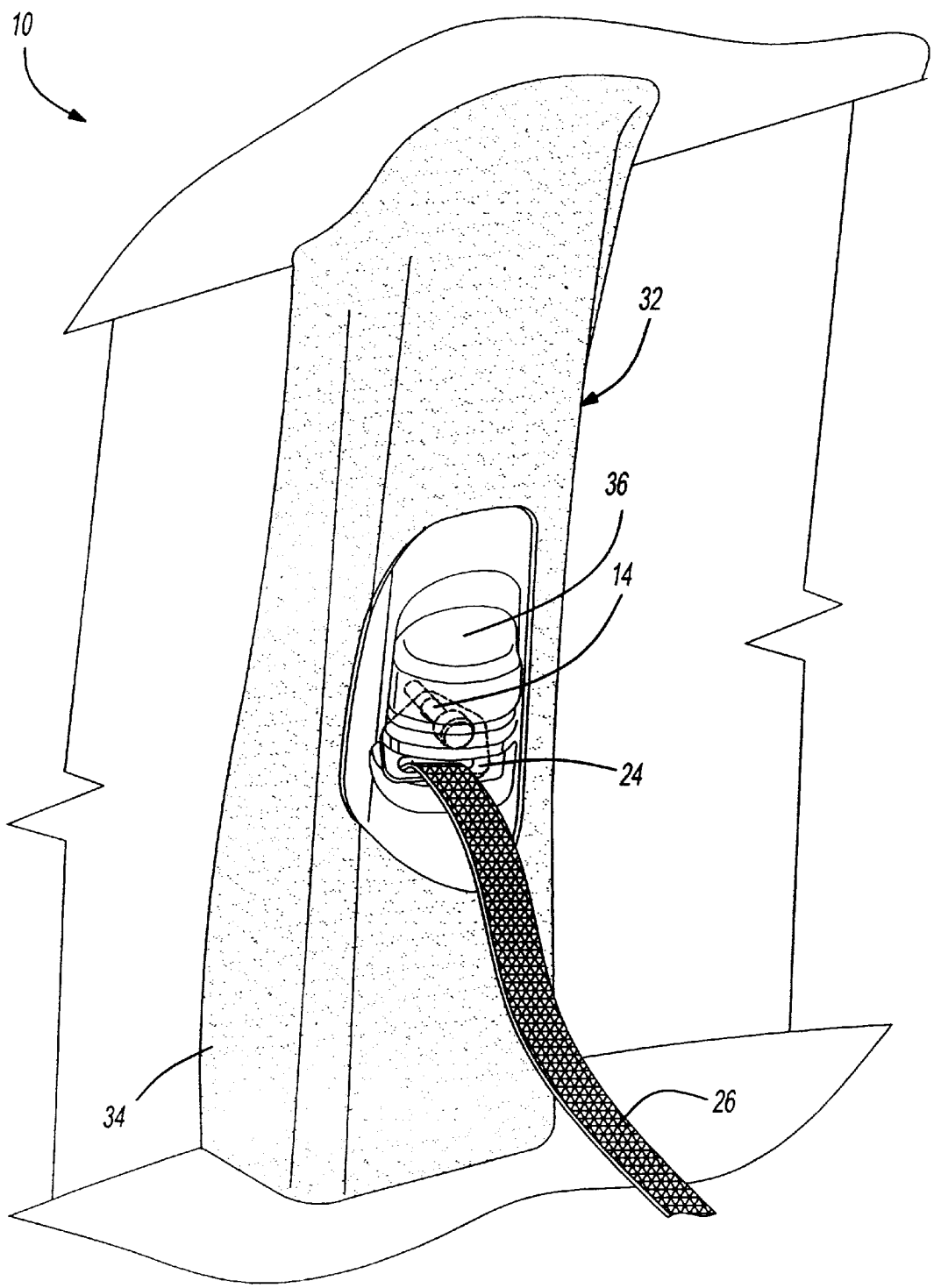
FIG. 1 is a perspective view of a seat belt anchor assembly, according to the present invention, for use in an automotive vehicle.

Referring to FIGS. 1 through 6, one embodiment of a seat belt anchor assembly 10, according to the present invention, is shown for a vehicle such as an automotive vehicle (not shown) wherein the vehicle includes an occupant or passenger compartment (not shown) having a side pillar 12 forming a structural part of the vehicle. The side pillar 12 is commonly referred to in the art as a B-pillar. The seat belt anchor assembly 10 includes an anchor bolt 14 threadingly secured to the side pillar 12 and having an elongated shank portion 16 defining a bolt axis and a head portion 18 having an outer cylindrical surface 20 extending axially from the shank portion 16 to an annular face 22 facing toward the interior of the occupant compartment, or facing outwardly away from the side pillar 12.

The seat belt anchor assembly 10 further includes a seat belt sling member 24, commonly referred to in the art as a D-ring, supported by the shank portion 16 of the anchor bolt 14 for receiving and supporting a seat belt webbing 26 forming an anchor point along the side pillar 12. As illustrated in FIG. 1, the seat belt sling member 24 includes an aperture 28 extending therethrough for receiving the shank portion 16 of the anchor bolt 14 and pivotally mounting the seat belt sling member 24 to the side pillar 12 of the vehicle. The seat belt sling member 24 farther includes an elongated slot 30 spaced below the aperture 28 for slidably receiving the seat belt webbing 26 therethrough as illustrated in FIGS. 1 and 2. The anchor bolt 14 and seat belt sling member 24 are typically metal members for supporting seat belts loads in a three-point type seat belt assembly as is commonly known in the art.

The seat belt anchor assembly 10 also includes a trim panel 32 secured to the side pillar 12 for covering at least the anchor bolt 14. The trim panel 32, as illustrated in FIGS. 1, 2, 3 and 6, includes an outer trim panel 34 fixedly secured to the side pillar 12 and an inner trim panel 36 slidably coupled to the outer trim panel 34 for covering the anchor bolt 14 and the seat belt sling member 24 and for providing vertical sliding adjustment of the anchor point along the side pillar 12. The inner trim panel 36 includes an elongated slot 38 in mating, or overlapping, alignment with the elongated slot 30 of the seat belt sling member 24 for slidably receiving the seat belt webbing 26 therethrough.

Figures 6, 7, 8, 9:
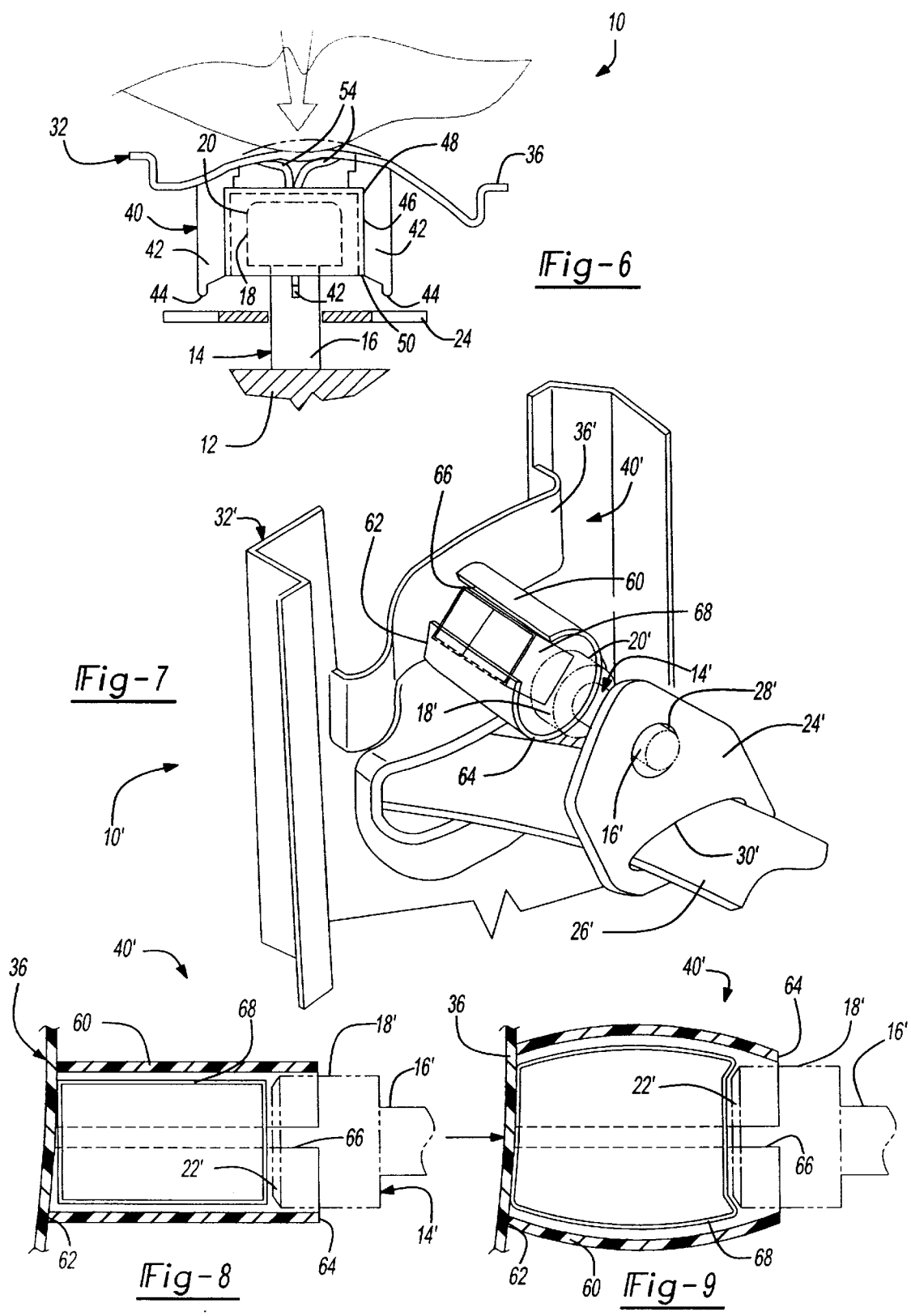
FIG. 6 is a fragmentary side view of the seat belt anchor assembly during impact loading.
FIG. 7 is a perspective view of another embodiment, according to the present invention, of the seat belt anchor assembly of FIG. 1.
FIG. 8 is a fragmentary elevational view of the seat belt anchor assembly of FIG. 7.
FIG. 9 is a view similar to FIG. 8 of the seat belt anchor assembly of FIG. 7 during impact loading.

Referring to FIGS. 3 and 6, the inner trim panel 36 of the seat belt anchor assembly 10 includes an energy absorbing member 40 extending axially between the inner trim panel 36 and the seat belt sling member 24. The energy absorbing member 40 includes a plurality of support ribs 42 extending axially toward the side pillar 12 from the inner trim panel 36 and toward the shank portion 16 to a distal end 44 opposite the outer cylindrical surface 20 of the head portion 18. The energy absorbing member 40 further includes a tubular member 46 supported by and between each of the support ribs 42 and axially spaced from the inner trim panel 36 for encapsulating the head portion 18 of the anchor bolt 14. The tubular member 46 extends from a first end 48 spaced from and adjacent to the inner trim panel 36 to a second end 50 adjacent the shank portion 16 of the anchor bolt 14. The energy absorbing member 40 also includes a planar shelf 52 attached to and closing the first end 48 of the tubular member 46. The planar shelf 52 is also spaced from and adjacent to the inner trim panel 36 as illustrated in FIGS. 3 and 6. The planar shelf 52 contacts the annular face 22 of the head portion 18 to dissipate energy through the energy absorbing member 40 in response to impacted forces acting upon the trim panel 32 through the interior of the occupant compartment. Upon an impact with the trim panel 32, and particularly the inner trim panel 36, the planar shelf 52 contacts the annular face 22 of the head portion 18 of the anchor belt 14. Since the planar shelf 52 is spaced from the inner trim panel 36 by the support ribs 42 and tubular member 46, the energy resulting from the impact forces with be absorbed by the structure of the energy absorbing member 40 prior to potential contact.

The energy absorbing member 40 of the seat belt anchor assembly 10 further includes a pair of planar, inclined ribs 54 positioned transverse, or at a predetermined angle, to the bolt axis, and secured to and extending between the planar shelf 52 and the inner trim panel 36 for deforming and absorbing energy during impact between the trim panel 32 and the head portion 18 of the anchor bolt 14. It should be appreciated that the energy absorbing member 40 is integrally molded with the trim panel 32.

As illustrated in FIGS. 3 and 6, if the inner trim panel 36 is impacted, the annular face 22 of the head portion 18 contacts the planar shelf 52. As energy is absorbed by the energy absorbing member 40, the planar shelf 52 presses against the inclined ribs 54 which are positioned transverse to the bolt axis. The planar shelf 52 will thus deform the inclined ribs 54 as the space between the inner trim panel 36 and the planar shelf 52 is diminished. The support ribs 42 and the tubular member 46 reinforce the planar shelf 52 and absorb additional energy during the impact with the trim panel 32.

Referring now to FIGS. 7 through 9, another embodiment 10', according to the present invention, of the seat belt anchor assembly 10 is shown. Like parts of the seat belt anchor assembly 10 have like reference numbers primed. In this embodiment, the seat belt anchor assembly 10' similarly includes an anchor bolt 14' fixedly secured to the side pillar (not shown) and having a shank portion 16' defining a bolt axis and a head portion 18' including an outer cylindrical surface 20' extending axially from the shank portion 16' to an annular face 22' facing toward the interior of the occupant compartment (not shown). The seat belt anchor assembly 10' includes a seat belt sling member 24' is supported by the shank portion 16' for receiving a seat belt webbing 26'. The seat belt anchor assembly 10' further includes a trim panel 32' adapted to be secured to the side pillar 12 for covering the anchor bolt 14' and seat belt sling member 24'. The trim panel 32' of the seat belt anchor assembly 10' includes an energy absorbing member 40' extending axially between the trim panel 32' and the head portion 18' of the anchor bolt 14'.

The energy absorbing member 40' of the seat belt anchor assembly 10' includes an elongated tubular member 60 extending axially from the trim panel 32' for receiving and encapsulating the head portion 18' of the anchor bolt 14'. The elongated tubular member 60 includes a first end 62 fixedly secured to the trim panel 32' and a second end 64 encircling the outer cylindrical surface 20' of the head portion 18'. The elongated tubular member 60 also includes a slot 66 extending axially between the first end 62 and the second end 64. The energy absorbing member 40' of the seat belt anchor assembly 10' further includes a generally rectangular ring member 68 disposed within the tubular member 60 between the trim panel 32' and the annular face 22' of the head portion 18' for contacting and deforming within the tubular member 60 upon axial contact with the annular face 22' to dissipate energy through the energy absorbing member 40' in response to impact forces acting upon the trim panel 32' through the interior of the occupant compartment. The ring member 68 is inserted through the slot 66 and seated transverse to the slot 66 within the tubular member 60. It should be appreciated that the energy absorbing member 40' is a separate add-on member made of a rigid material such as metal.

In operation, upon impact with the trim panel 32', the ring member 68 will engage the annular face 22' of the head portion 18' of the anchor bolt 14' and deform outwardly to a bell-shaped configuration, as illustrated in FIG. 9, to absorb energy of the impact force. The slot 66 in the tubular member 60 also allows the tubular member 60 to deform outwardly by the force of the ring member 68 to further absorb the energy of the impact force.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat belt anchor assembly for an automotive vehicle including an occupant compartment having a side pillar, comprising:

an anchor bolt adapted to be fixedly secured to the side pillar and having a shank portion defining a bolt axis and a head portion comprising an outer cylindrical surface extending axially from said shank portion to an annular face facing toward an interior of the occupant compartment;

a seat belt sling member supported by said shank portion for receiving a seat belt webbing forming an anchor point along the side pillar;

a trim panel adapted to be secured to the side pillar for covering at least said anchor bolt, said trim panel having an energy absorbing member extending axially between said trim panel and said head portion of said anchor bolt and integrally molded with said trim panel to form a one-piece member; and said energy absorbing member comprising a hollow tubular member operatively connected to and axially spaced from said trim panel for encapsulating said head portion of said anchor bolt and a planar shelf closing an end of said tubular member adjacent said trim panel for contacting said annular face of said head portion to dissipate energy through said energy absorbing member in response to impact forces acting upon said trim panel through the interior of the occupant compartment.

2. A seat belt anchor assembly as set forth in claim 1 wherein said energy absorbing member includes a pair of inclined ribs extending transverse to said bolt axis between said planar shelf and said trim panel for deforming and absorbing energy during impact between said trim panel and said head portion of said anchor bolt.

3. A seat belt anchor assembly as set forth in claim 2 wherein said seat belt sling member includes an aperture for receiving said shank portion therethrough and pivotally mounting said seat belt sling member to the side pillar of the vehicle.

4. A seat belt anchor assembly as set forth in claim 3 wherein said seat belt sling member includes an elongated slot spaced from said aperture for slidably receiving said seat belt webbing therethrough.

5. A seat belt anchor assembly as set forth in claim 4 wherein said trim panel includes an outer trim panel cover fixedly secured to the side pillar and an inner trim panel slidably coupled to said outer trim panel for covering said anchor bolt and said seat belt sling member and for providing vertical adjustment of said anchor point along the side pillar.

6. A seat belt anchor assembly as set forth in claim 5 wherein said inner trim panel includes an elongated slot in mating alignment with said elongated slot of said seat belt sling member for slidably receiving said seat belt webbing therethrough.

7. A seat belt anchor assembly as set forth in claim 1 wherein said energy absorbing member includes a plurality of support ribs extending from said trim panel toward said shank portion adjacent said outer cylindrical surface of said head portion.

8. A seat belt anchor assembly for an automotive vehicle including an occupant compartment having a side pillar, comprising:

an anchor bolt adapted to be fixedly secured to the side pillar and having a shank portion defining a bolt axis and a head portion comprising an outer cylindrical surface extending axially from said shank portion to an annular face facing toward an interior of the occupant compartment;

a seat belt sling member supported by said shank portion for receiving a seat belt webbing forming an anchor point along the side pillar;

a trim panel adapted to be secured to the side pillar for covering at least said anchor bolt, said trim panel having an energy absorbing member extending axially between said trim panel and said head portion of said anchor bolt and integrally molded with said trim panel to form a one-piece member; and said energy absorbing member comprising an elongated tubular member extending axially from said trim panel for receiving and encapsulating said head portion of said anchor bolt and a generally rectangular ring member disposed within said tubular member between said trim panel and said annular face of said head portion for contacting and deforming upon axial contact with said annular face of said head portion to dissipate energy through said energy absorbing member in response to impact forces acting upon said trim panel through the interior of the occupant compartment.

9. A seat belt anchor assembly for an automotive vehicle including an occupant compartment having a side pillar, comprising:

an anchor bolt adapted to be fixedly secured to the side pillar and having a shank portion defining a bolt axis and a head portion comprising an outer cylindrical surface extending axially from said shank portion to an annular face facing toward an interior of the occupant compartment;

a seat belt sling member supported by said shank portion for receiving a seat belt webbing forming an anchor point along the side pillar;

a trim panel adapted to be secured to the side pillar for covering at least said anchor bolt, said trim panel having an energy absorbing member extending axially between said trim panel and said head portion of said anchor bolt;

said energy absorbing member comprising an elongated tubular member extending axially from said trim panel for receiving and encapsulating said head portion of said anchor bolt and a generally rectangular ring member disposed within said tubular member between said trim panel and said annular face of said head portion for contacting and deforming upon axial contact with said annular face of said head portion to dissipate energy through said energy absorbing member in response to impact forces acting upon said trim panel through the interior of the occupant compartment; and wherein said elongated tubular member includes a first end secured to said trim panel and a second end encircling said outer cylindrical surface of said head portion.

10. A seat belt anchor assembly as set forth in claim 9 wherein said elongated tubular member includes a slot extending axially between said first end and said second end for inserting said ring member within said elongated tubular member between said trim panel and said head portion of said anchor bolt.

11. A seat belt anchor assembly for an automotive vehicle including an occupant compartment having a side pillar, comprising:

an anchor bolt adapted to be fixedly secured to the side pillar and having a shank portion defining a bolt axis and a head portion comprising an outer cylindrical surface extending axially from said shank portion to an annular face facing toward an interior of the occupant compartment;

a seat belt sling member supported by said shank portion for receiving a seat belt webbing forming an anchor point along the side pillar;

a trim panel adapted to be secured to the side pillar for covering at least said anchor bolt, said trim panel having an energy absorbing member extending axially between said trim panel and said head portion of said anchor bolt and integrally molded with said trim panel to form a one-piece member;

said energy absorbing member comprising at least one support rib extending axially from said trim panel toward said shank portion adjacent said head portion and a hollow tubular member connected to said at least one support rib and axially spaced from said trim panel for encapsulating said head portion of said anchor bolt and a planar shelf closing an end of said tubular member and supported by said at least one support rib spaced between said trim panel and said annular face of said head portion for engaging said annular face to dissipate energy through said energy absorbing member in response to impact forces acting upon said trim panel through the interior of the occupant compartment.

* * * * *